United States Patent [19]

Neumann

[11] Patent Number: 4,648,581

[45] Date of Patent: Mar. 10, 1987

[54] COUPLING HEAD FOR PRESSURE MEDIUM LINES OF PRESSURE MEDIUM BRAKE UNITS IN VEHICLES

[76] Inventor: Dietrich Neumann, Schulstrasse 41, 6923 Waibstadt, Fed. Rep. of Germany

[21] Appl. No.: 752,376

[22] Filed: Jul. 5, 1985

[30] Foreign Application Priority Data

Jul. 7, 1984 [DE] Fed. Rep. of Germany ....... 3425113

[51] Int. Cl.[4] .............................................. F16L 29/00
[52] U.S. Cl. ................................ 251/149.6; 251/344; 137/614.02
[58] Field of Search ............... 251/149, 149.1, 149.3, 251/149.6, 149.8, 343, 344; 137/614, 614.01, 614.02, 614.03

[56] References Cited

U.S. PATENT DOCUMENTS

| | | | |
|---|---|---|---|
| 2,705,159 | 3/1955 | Pfau | 137/614.03 X |
| 2,905,486 | 9/1959 | Goodin, Jr. et al. | 137/614.03 |
| 3,450,424 | 6/1969 | Calisher | 137/614.03 X |
| 3,825,223 | 7/1974 | Richardson | 251/149.6 |
| 3,871,404 | 3/1975 | Courant | 137/614.03 |
| 4,086,939 | 5/1978 | Wilcox et al. | 251/149.6 X |
| 4,327,770 | 5/1982 | Brown et al. | 137/614.03 X |

FOREIGN PATENT DOCUMENTS

| | | | |
|---|---|---|---|
| 616242 | 3/1961 | Canada | 137/614.03 |
| 632876 | 11/1978 | U.S.S.R. | 251/149 |

Primary Examiner—A. Michael Chambers
Assistant Examiner—John C. Fox
Attorney, Agent, or Firm—Becker & Becker, Inc.

[57] ABSTRACT

A coupling head for pressure medium lines of pressure medium break units in vehicles. The coupling head has a valve body which is fixedly disposed in a main body of the coupling head. During the connection of the coupling head with a cooperating coupling head, the actuating member is moved, whereby the valve of the coupling head is opened for the passage of pressure medium. In the closure position, the actuating member rests against an abutment, in the vicinity of which is fixedly disposed a sealing element, at least a portion of the periphery of which is braced against transverse deformation. Due to the fixed valve body, the coupling head has a structurally simple design and can be easily assembled. A sealing element acts as a static seal, and is subjected to only slight wear. Due to the fact that the sealing element is braced against transverse deformation, an unduly or unacceptably great deformation of the sealing element is reliably prevented.

12 Claims, 6 Drawing Figures

COUPLING HEAD FOR PRESSURE MEDIUM LINES OF PRESSURE MEDIUM BRAKE UNITS IN VEHICLES

FIELD OF THE INVENTION

1. Background of the Invention

The present invention relates to a coupling head for pressure medium lines of pressure medium brake units in vehicles, and includes: A main body having at least one supply inlet, and at least one outlet opening, for the pressure medium; a valve body fixedly disposed in the main body; a sealing element of elastic material which is fixedly disposed in a mounting space, with at least a portion of the periphery of the sealing element being braced against transverse deformation, with the sealing element furthermore being able to block off access from the supply inlet to the outlet opening; and an actuating member which, when the coupling head is connected to a cooperating coupling head, is displaceable against spring force for opening the passage from the supply inlet to the outlet opening for the pressure medium; provided on the valve body is an abutment against which at least one counter abutment of the actuating member rests under force.

2. Description of the Prior Art

Such coupling heads serve, together with a cooperating coupling head, to produce the compressed air connection between a pulling vehicle and a trailer. As soon as the cooperating coupling head is connected with the coupling head, the passage from the supply line to the exit line for the pressure medium is opened via the actuating member, so that the compressed air can pass from the pulling vehicle to the trailer. If the cooperating coupling head, which is disposed on the trailer, is not connected with the coupling head of the pulling vehicle, the valve body closes the passage from the supply line to the exit line.

A coupling head is known (see German Offenlegungsschrift No. 16 30 101) according to which the valve body is displaceably mounted in the main body and is under the force of a compression spring which pushes it against a sealing surface. Located axially opposite the valve body is the actuating member, which is embodied as a sleeve and engages against the compression spring, which is supported in the base of a cup which is displaceably mounted in the main body. In the closure position, the actuating member is spaced from the valve body. When the cooperating coupling head is attached to the coupling head, the cup is retracted, whereby the compression spring displaces the actuating member in the direction toward the valve body. The latter is thus retracted from its sealing surface, so that the compressed air can now flow from the supply line through the exit line to the trailer. This heretofore known coupling head is structurally complex and expensive, and takes a lot of time and effort to assemble. Just for the valve body, two additional parts are required, namely the compression spring and a support part for the compression spring, so that already the assembly of the valve body itself is complicated. The cup, which is displaceably mounted in the main body, is necessary for the compression spring of the actuating member. This cup is also an additional component, and further complicates the assembly of the coupling head. Due to the large number of components, the coupling head is furthermore susceptible to problems. Since the valve body and the actuating member are spring loaded in opposite directions, the pertaining springs must be very precisely coordinated with one another in order to permit the necessary movements of the valve body and of the actuating member. The compression spring for the actuating member must be stronger than the compression spring for the valve body, so that when the cooperating coupling head is attached, the valve body can be displaced out of its closure position into its open position. During attachment of the coupling head there exists the danger that the springs are fatigued, so that the required spring coordination no longer exists. The valve body itself is embodied has a sealing element, and comprises an appropriate sealing material. Since in the closure position, the valve body constantly rests against the sealing surface under spring force, it is exposed to very high stresses. There exists the danger accordingly that the valve body with time will be plastically radially outwardly deformed under the stress, especially if it is made of an appropriate resilient material. If this occurs, a satisfactory sealing is no longer ensured.

Pursuant to another known coupling head (German Gebrauchsmuster No. 78 36 112), a stepped bore is provided in the main body; the actuating member is displaceably mounted in this bore against spring force. The valve body has a support body which comprises numerous parts, and on the underside of which is provided the sealing element, which is made of elastic material. In the closure position, the actuating member rests against an abutment provided on the main body under the force of the compression spring and under the force of the pressure medium. Furthermore, the actuating member is provided with a further flange which forms a counter abutment with which the actuating member also rests against the sealing element in the closure position. Since the actuating member in the closure position thus rests against appropriate abutments with two surfaces, the actuating member must be machined very precisely, so that in the closure position it rests against the pertaining abutments. This requires that very close manufacturing tolerances be maintained, which increases the cost of manufacturing such coupling heads. The sealing element is formed by a sealing ring which must be significantly elastically stretched during assembly of the coupling head. In order for the sealing element to be able to reach its installed position, it must be pushed over the flanges of the actuating member. Thus, the sealing element must be overstretched, which could lead to preliminary damage, which in turn could lead to premature failure during operation of the coupling head. As a result of the two flanges of the actuating member, the ring-shaped support body must be embodied as several parts so that it can be assembled in its installed position. Thus this heretofore known coupling head also comprises a number of components, namely the actuating member, the multi-part support body, the sealing element, the compression spring, and the abutment for the actuating member. The assembly of this coupling head is thus complicated, and its manufacture is costly. The large number of components leads to an increased susceptibility of the coupling head to failure during operation.

An object of the present invention is to provide a coupling head of the aforementioned general type which can be easily assembled from a few parts, and has a valve body with a long service life.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
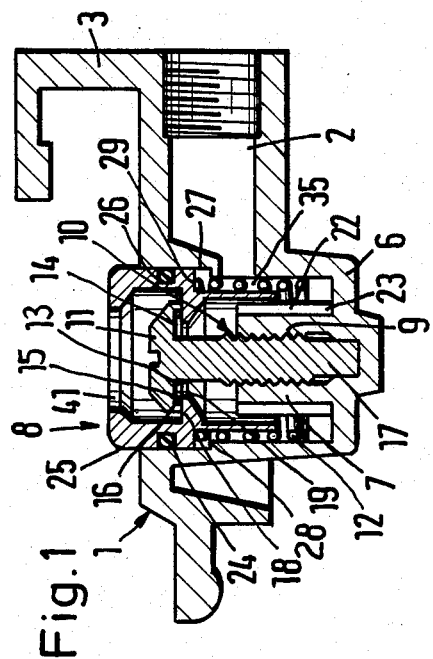
FIG. 1 is a cross-sectional view of a first embodiment of the inventive coupling head.

The coupling head of the present invention is characterized primarily in that the valve body is formed by a screw which is screwed into a threaded bore of a guide part of the main body, in that a head of the valve screw is provided with the abutment for the actuating member, which surrounds and is spaced from the valve screw, in that the thickness of the sealing element is greater than the depth of the mounting space, and in that at least one flow-through channel is provided between the guide part and the actuating member for connecting the supply inlet with the outlet opening in the open position of the actuating member.

With the inventive coupling head, the valve body is formed by a screw which is screwed into the threaded bore of the guide part of the main body. Thus, by means of a simple screwing process, the valve screw can be mounted in the main body of the coupling head. No further measures are necessary for mounting the valve screw. In particular, no close tolerances have to be maintained during the manufacture of the valve screw, because the latter can be adjusted into any desired position as it is screwed in, so that during the mounting, manufacturing tolerances can be taken into consideration and compensated for in a simple manner. The sealing element is easy to dispose in the mounting space, preferably being directly vulcanized in the mounting space, so that preliminary damage and/or overstrecthing of the sealing element is prevented. Only a single abutment is provided for the actuating member, with this abutment being provided on the screw head. This assures that the acutating member reliably rests against the abutment in the closure position without having to maintain close tolerances during manufacture, with this sealing abutment of the actuating member satisfactorily blocking the passage of pressure medium from the supply inlet to the exit line. Since the thickness of the sealing element is greater than the depth of the mounting space, the sealing element is elastically deformed in the closure position, thus assuring a satisfactory sealing. Although the actuating member is guided on the guide part, the compressed air which flows through the supply inlet can flow without difficulty to the outlet opening via the flow-through channel, which is provided between the guide part and the actuating member. In contrast to the heretofore known coupling heads, the valve device of the inventive coupling head comprises only a small number of components, namely the valve screw, the actuating member, the compression spring, and the sealing element. The inventive coupling head is thus characterized by a structurally very simple design and, due to the low number of components, by a very simple assembly. The sealing element can already be effortlessly disposed in the mounting space prior to the assembly of the coupling head. Prior to screwing in the valve screw, it is merely necessary to place the actuating member, along with its compression spring, into the main body, and to thereupon screw the valve screw into the guide part. The inventive coupling head is then already completely assembled.

Pursuant to specific features of the present invention, the counter abutment of the actuating member may be a radially inwardly directed circumferential flange. The guide part may extend from a base of the main body. The mounting space may be an annular groove in the underside of the screw head. In this case, the sealing element rests radially inwardly against a shaft of the valve screw.

The mounting space may also be a recess in the counter abutment of the actuating member.

The flow-through channel may be formed by an axially extending recess in the outside of the guide part. The actuating member may comprise two parts which are rigidly interconnected with one another, with one of the parts having a sleeve-like end section upon which the other part of the actuating member rests while partially overlapping it. The sleeve-like end section may extend from a radially outwardly directed flange of the other section of this part of the actuating member. At least one sealing member may be seated in an annular groove on the actuating member; this annular groove for the sealing element may be delimited by the flange of the one part and its sleeve-like end section, as well as by an end face of the other part of the actuating member. The two parts of the actuating member may be made of plastic, for example a polyamide, and may be interconnected by ultrasonic welding. The valve body may have a through-bore which connects a pressure space with a second supply inlet of the main body; the pressure space, when viewed in the direction of flow of the pressure medium, may be disposed after the valve screw.

DESCRIPTION OF PREFERRED EMBODIMENTS

Figure 2:
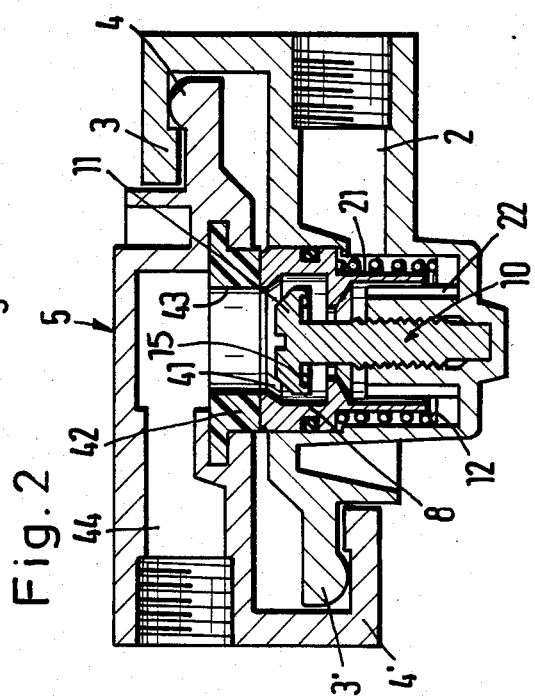
FIG. 2 is a view showing an axial section through the coupling head of FIG. 1, with a cooperating coupling head being attached thereto.

Referring now to the drawings in detail, the coupling head of FIG. 1 has a main body 1, which is provided with a supply bore 2 for hydraulic or pressure medium. The coupling head is provided on a pulling vehicle, and is connected to the brake unit of the vehicle via a non-illustrated pressure line which is secured in the supply bore 2. The one-piece main body 1, for example, may be made of light metal. In a known manner, the main body 1 has a holding part 3 which has an L-shaped cross section and overlaps a corresponding cooperating holding part 4 (FIG. 2) of a cooperating coupling head 5 when the latter is connected with the coupling head. The two coupling heads are positively interconnected by means of the holding part 3 and the cooperating holding part 4.

Projecting from the base 6 of the main body 1 is a guide part 7 for an actuating member 8. The guide part 7 is provided with a threaded bore 9 into which a valve body 10 is screwed.

The valve body 10 is embodied as a valve screw and is provided with an abutment 11 against which the actuating member 8, in the closure position (FIG. 1), rests under the force of a compression spring 12. The abutment 11 is advantageously formed by the head of the valve screw 10, so that no separate structural part is required therefor. An annular groove 14 is provided in the underside 13 of the head; a sealing element 15 is placed into the annular groove 14. The sealing element 15 is in the form of a flat sealing ring, and is made of elastic material. In order to ensure a reliable seating of the elastic sealing element 15 in the annular groove 14, the sealing element can be glued to, vulcanized to, or otherwise connected to the head 11 of the valve body 10. In order to assure the necessary sealing effect in the closure position of the valve 8, 10, the sealing element 15 extends slightly out of the annular groove 14, so that in the closure position the actuating member 8 rests tightly against the sealing element. Since the sealing element 15 is provided on the abutment 11 of the valve body 10, which is fixedly disposed in the main body 1, the sealing element forms a static seal which is exposed to only slight stress during the operation of the coupling head. As a result, the sealing element has a long service life.

The sealing element 15 can be premounted on the valve body 10 since the latter, rather than being embodied in one piece with the main body 1, is screwed into the guide part 7 thereof. As a result, the sealing element is easy to mount, and if necessary can be replaced without difficulty.

In order to avoid an undue or unacceptably transverse deformation of the sealing element 15, at least a portion of the periphery of the latter is braced against this transverse deformation. Preferably, the entire periphery of the sealing element 15 is braced against transverse deformation. For this purpose, a support part 16 is provided on the abutment 11; this support part 16 is formed by that edge of the abutment 11 which delimits the annular groove 14. The sealing element 15 is braced radially outwardly by means of this support part 16. The annular groove 14 is delimited radially inwardly by a shaft 17 of the valve body 10. As shown in FIG. 1, the radially inner edge of the sealing element 15 rests against the shaft 17, thus, in a structurally very simple manner, also achieving a radially inward bracing of the sealing element. In order not to adversely effect the sealing in the closure position of the valve 8, 10, the end face 18 of the support part 16 is recessed slightly relative to the underside 19 of the sealing element 15. At the same time, the end face 18 of the support part 16 forms an abutment surface for the actuating member 8 in the closure position of the valve 8, 10. The support part 16 thus also prevents the sealing element 15 from being unduly unacceptable axially deformed to too great an extent by the actuating member 8. As soon as the actuating member 8 comes to rest against the end face 18 of the support part 16, a further axial deformation of the sealing element 15 is no longer possible.

The valve body 10 has a number of functions within the coupling head. As a result, only one single structural element is required for these various functions. For one thing, the valve body 10 serves to seal the coupling head when it is not connected with the cooperating coupling head 5. Furthermore, the valve body 10 serves as an abutment for the actuating member 8 in the closure position of the valve 8, 10. Finally, the valve body 10 is embodied in such a way that a sealing element 15 combined therewith can be neither radially nor axially stressed to an undue or unacceptable level. To replace the sealing element 15, it is merely necessary to screw the valve body 10 out of the threaded bore 9 of the main body 1.

Figure 4:
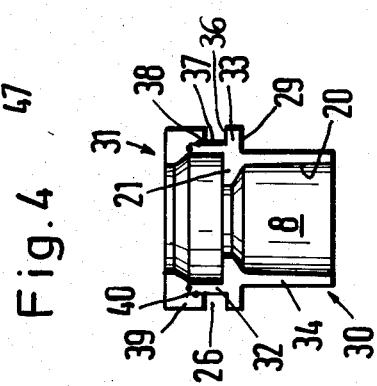
FIG. 4 a view showing shows the actuating member of the inventive coupling head.

In order to keep the outer dimensions of the coupling head small, the valve body 10 is nearly completely accommodated in the actuating member 8. The latter is embodied as a hollow body which surrounds the valve body 10, is spaced therefrom, and is guided on the guide part 7 of the main body 1. As shown in FIG. 4, the inside 20 of the actuating member 8 is provided with at least one counter abutment 21 with which the actuating member, in the closure position of the valve 8, 10, rests against the abutment 11 of the valve body 10 (FIG. 1). The counter abutment 21 is a radially inwardly directed circumferential flange with which the entire periphery of the actuating member 8 rests sealingly against the sealing element 15 in the closure position. For reasons of stability and strength, the flange 21 tapers radially inwardly, and has a trapezoidal cross-section. The counter abutment 21 is provided approximately half way along the length of the actuating member 8.

So that the pressure medium which flows through the supply bore 2 into the coupling head when the valve 8, 10 is opened (FIG. 2) can flow to the cooperating coupling head 5, axial flow-through openings 22 are provided between the guide part 7 of the main body 1 and the actuating member 8. The openings 22 are formed by the fact that the guide part 7 is provided on its outside with spaced apart, axially extending, fin-shaped raised portions 23 which are distributed at a distance from one another over the periphery of the guide part, and delimit the flow-through openings in the circumferential direction. The actuating member 8, in turn, is disposed in a sealed manner in the main body 1. For this purpose, a seal 24 is placed upon the actuating member 8. The seal 24 is accommodated in an annular groove 26 provided on the outside, exterior or surface 25 of the actuating member. The actuating member 8 is axially displaceably guided via the outside, exterior or surface 25 in a bore 27 of the main body 1. The wall of the bore has a shoulder 28 which delimits the displacement path of the actuating member 8 in the direction toward the guide part 7.

In order to be able to provide the annular groove 26 on the actuating member 8 without any milling work, the actuating member comprises two parts 30 and 31 which are securely interconnected (FIG. 4). The part 30 has a sleeve-like end section 32 upon which the other part 31 is seated in such a way that it partially overlaps the end section 32. The sleeve-like end section 32 extends axially outwardly from the radially inwardly directed flange 21. At the level of this inner flange 21, the part 30 is provided with a radially outwardly directed flange 33 which has a rectangular cross-section. At that end remote from the end section 32, a further sleeve-like end section 34, which has a smaller outer diameter than does the end section 32, is connected to the flange 33. As a result of the smaller diameter, an annular space 35 (FIG. 1) remains between the end section 34 and the wall of the bore of the main body 1; the compression spring 12 can extend into this annular space 35. The spring 12 is supported against the underside of the flange 33 remote from the part 31; this underside of the flange 33 also forms the counter abutment 29 for the actuating member 8. The annular groove 26 is delimited by the opposite side 36 of the flange 33 together with a portion of the outer surface 37 of the end section 32 and the end face 38 of the part 31. The part 31 of the actuating member 8 is essentially ring-shaped, and has an annular part 39 which rests upon the end section 32.

Since the annular groove 26 is delimited by the two parts 30 and 31, it is not formed until these two parts are joined together. It is therefore not necessary to produce the annular groove 26 by a machining process. Rather, the two parts 30, 31 of the actuating member 8 can be made of plastic as injection molded parts which are subsequently interconnected, preferably by ultrasonic welding. Before the two parts are welded together, the seal 24 is pushed onto the end section 32 until it rests against the flange 33. In this way, the seal 24 can be disposed on the actuating member 8 in a very simple manner. The dividing line 40 between the two parts 30 and 31 of the actuating member 8, where the welding takes place, is indicated by dots in FIG. 4.

The actuating member 8 extends beyond the main body 1 when the cooperating coupling head 5 is not attached (FIG. 1). In this position, the radially inwardly directed counter abutment 21 of the actuating member 8 rests sealingly against the sealing element 15. As a result, the passage from the supply bore 2 to an outlet opening 41 via the flow-through openings 22 is blocked. The outlet opening 41 is provided in that end of the actuating member 8 which extends beyond the main body 1. When the cooperating coupling head 5 is attached to the coupling head (FIG. 2), the actuating member 8 is displaced against the force of the compression spring 12. In so doing, the counter abutment 21 on the inside of the actuating member 8 is retracted from the abutment 11 of the valve body 10. In a known manner, the cooperating coupling head 5 has a cylindrical sealing element 42 which in the coupling position rests upon the actuating member 8 and holds the latter in its axially displaced position. The outlet opening 41 of the actuating member 8 is aligned with a cylindrical opening 43 of the sealing element 42. The coupling head is provided with a further holding part 3' which is disposed on the opposite side from the holding part 3 and is surrounded in a known manner by a further cooperating holding part 4' of the cooperating coupling head 5. The latter, which is provided on the trailer of the pulling vehicle, has a connection bore 44 for a compressed air line of the brake unit of the trailer. In the coupled state, the valve 8, 10 is constantly open, so that the compressed air required for braking can flow into the connection bore 44 from the supply bore 2 via the flow-through openings 22 and the outlet opening 41.

The coupling head can be used in two-line compressed-air-brake units to connect the supply and brake lines of the pulling vehicle with the trailer vehicle. In order to be able to differentiate the coupling heads for the brake line and for the supply line, these coupling heads are provided in a known manner with differently colored protective caps (not illustrated) which in the uncoupled state (FIG. 1) cover the projecting end of the actuating member 8 to thus prevent dirt from entering the valve 8, 10 through the outlet opening 41.

As soon as the cooperating coupling head 5 is separated from the coupling head, the valve 8, 10 closes automatically. The compression spring 12 again presses the actuating member 8 into its closure position, in which the counter abutment 21 rests against the abutment 11 of the valve body 10.

Figure 3:
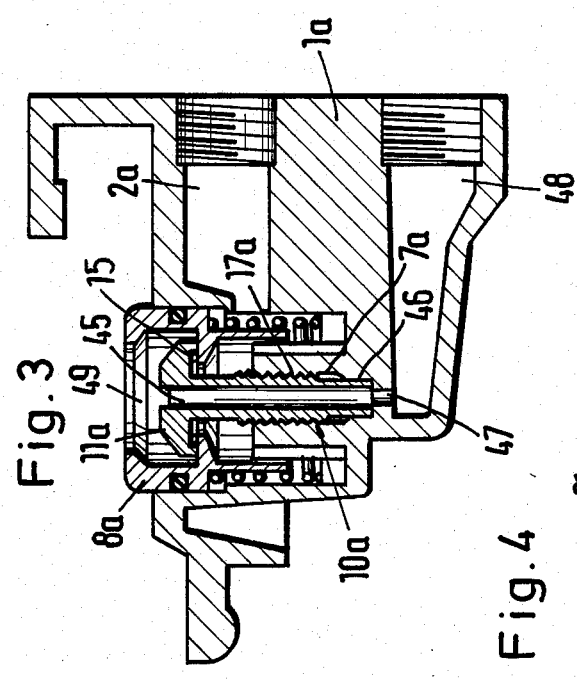
FIG. 3 is a view showing a section through a second embodiment of the inventive coupling head.

In the embodiment illustrated in FIG. 3, the valve body 10a is provided with a through-bore 45 which extends through the shaft 17a and the abutment 11a. The base 46 of the guide part 7a of main body 1a is provided with a bore 47 which opens into the through-bore 45 and connects the latter with a second supply bore 48 in the main body 1a. A pneumatic or hydraulic signal or control line can be connected to the through-bore 45 of the valve body 10a. The through-bore 45 is constantly open, even when the valve 8a, 10a is closed. The through-bore 45 connects the supply bore 48 with a surge chamber or pressure space 49 which, when viewed in the direction of flow of the respective pressure medium, is disposed after the valve body 10a. In other respects, the coupling head of FIG. 3 is embodied in the same manner as is the coupling head of FIGS. 1 and 2.

As soon as the cooperating coupling head has been attached and the actuating member 8a has been displaced in the manner previously described, the pressure medium can flow from the supply bore 2a through the opened valve 8a, 10a. However, a portion of the pressure medium can also flow via the through-bore 45 into the supply bore 48, and from there into the connected line. This line connects the coupling head with a non-illustrated trailer control valve, which is connected in a known manner with the brake unit of the trailer vehicle. If the pulling vehicle is operated without a trailer, the valve 8a, 10a of the coupling head is closed. As a result, the compressed air can no longer flow into the line which connected to the supply bore 48 and leads to the trailer control valve. Thus, no shut off valve is needed in the coupling head of the brake line because no compressed air is then controlled by the trailer control valve during a braking operation.

Figure 5:
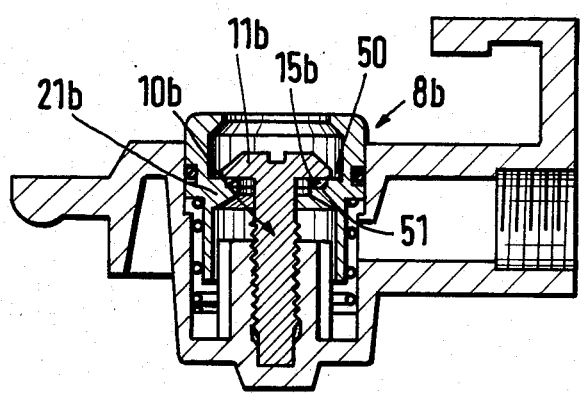
FIG. 5 is a cross-sectional view of a third embodiment of the inventive coupling head.
Figure 6:
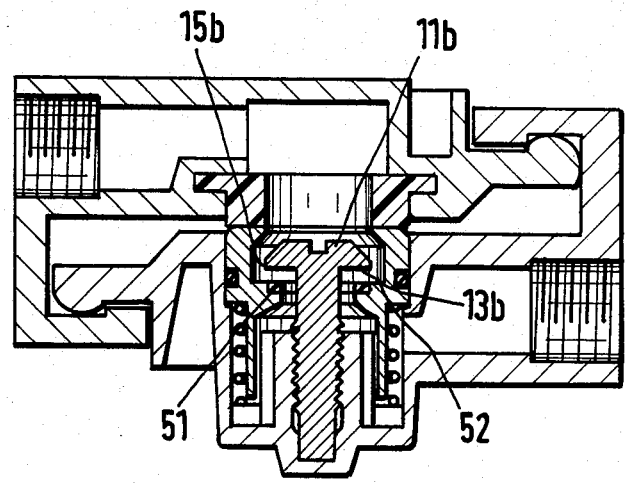
FIG. 6 is a view showing an axial section through the coupling head of FIG. 5, with a cooperating coupling head attached thereto.

In the embodiment illustrated in FIGS. 5 and 6, the sealing element 15b is not mounted on the screw head 11b of the valve screw 10b, but rather is mounted on the actuating member 8b. The counter abutment 21b of the actuating member 8b is embodied as a flange and is provided on that side 50 thereof which faces the screw head 11b with a recess 51 in which the sealing element 15b is accommodated. The recess 51 is open toward the valve screw 10b. The sealing element 15b is ring shaped, and is made of elastic material. The sealing member can be glued into the recess 51, but is preferably vulcanized therein. In contrast to the previously described embodiments, the underside 13b (FIG. 6) of the screw head 11b is planar. Over the entire periphery, the sealing element 15b is supported against transverse deformation by the radially outer shoulder surface 52 of the recess 51, so that an undue or unacceptable level of deformation of the sealing element is prevented. The thickness of the sealing element 15b is greater than the depth of the recess 51, so that in the closure position, the actuating member 8b along with the sealing element 15b rests reliably against the underside 13b of the screw head 11b. In other respects, this embodiment is embodied in the same way as is the embodiment of FIGS. 1 and 2.

The sealing element of the embodiment of FIG. 3 can also be provided on the actuating member in the same way as is done with the embodiment of FIGS. 5 and 6.

With the previously described inventive coupling heads, the valve screws 10, 10a, and 10b can no longer be displaced, but are rather fixedly disposed in the main body 1, 1a. As a result, no additional components are required for the main body, such as a compression spring and a support part for such a spring. This not only eliminates additional components which make the coupling head more expensive, but it also makes it considerably easier to assemble the coupling head. Only the actuating member 8, 8a, 8b is displaceably mounted in the main body 1, 1a. In the closure position, this actuating member rests against the valve screw 10, 10a, 10b which is secured to the housing, and thus blocks the passage of pressure medium from the supply bore 2, 2a to the outlet opening 41. The inventive coupling heads are not very susceptible to disturbance, and ensure a satisfactory functioning over their entire service life. The sealing element 15, 15b is subjected to only very little wear. Since the sealing element is braced against transverse deformation over its periphery, relatively high forces can be exerted upon the sealing element without the danger existing that the sealing element will be outwardly deformed to an unduly or unacceptably great extent. As a result, relatively great sealing forces can be applied in order to achieve a reliable sealing effect without having to worry that these high forces will have an adverse affect on the service life of the sealing element 15, 15b.

The present invention is, of course, in no way restricted to the specific disclosure of the specification and drawings, but also encompasses any modifications within the scope of the appended claims.

What I claim is:

1. A coupling head for pressure medium lines of pressure medium brake units in vehicles, said coupling head including: a main body having at least one supply inlet, and at least one outlet opening, for said pressure medium; a valve body fixedly disposed in said main body; a sealing element of elastic material which is fixedly disposed in a mounting space, with at least a portion of the periphery of said sealing element being braced against transverse deformation, said sealing element furthermore being able to block off access of said supply inlet to said outlet opening; and an actuating member which, when said coupling head is connected to a cooperating coupling head, is displaceable against spring force for opening the passage from said supply inlet to said outlet opening for said pressure medium on said valve body there being provided an abutment against which at least one counter abutment of said actuating member rests under force; the improvement wherein:
    said main body is provided with a guide part for said actuating member which has a threaded bore;
    said valve body being formed by a screw which is screwed into said threaded bore of said guide part;
    said valve screw having a head which includes said abutment for said actuating member, with the latter surrounding, and being spaced from, said valve screw;
    said mounting space being provided on one of said abutment and said actuating member, with the thickness of said sealing element being greater than the depth of said mounting space;
    at least one flow-through channel provided between said guide part and said actuating member; in the open position of said actuating member, said flow-through channel connecting said supply inlet with said outlet opening; and
    a pressure space which, when viewed in the direction of flow of pressure medium through said coupling head, is disposed after said valve screw, said main body being provided with a second supply bore, said valve screw being provided with a through-bore for connecting said pressure space with said second supply bore.

2. A coupling head according to claim 1, in which said counter abutment of said actuating member is in the form of a circumferentially extending, radially inwardly directed flange.

3. A coupling head according to claim 2, in which said main body has a base from which said guide part extends toward said counter abutment flange of said actuating member.

4. A coupling head according to claim 3, in which said screw head abutment has an underside which faces said base of said main body, and in which is provided said mounting space in the form of an annular groove.

5. A coupling head according to claim 4, in which said valve screw includes a shaft, with said sealing element having a radially inwardly directed surface which rests against said shaft.

6. A coupling head according to claim 3, in which said mounting space is a recess in said counter abutment of said actuating member.

7. A coupling head according to claim 3, in which each of said flow-through channels is in the form of a respective axially extending recess in the outer surface of said guide part.

8. A coupling head according to claim 3, in which said actuating member comprises two parts, namely a first part and a second part, which are securely interconnected.

9. A coupling head for pressure medium lines of pressure medium brake units in vehicles, said coupling head including: a main body having at least one supply inlet, and at least one outlet opening, for said pressure medium; a valve body fixedly disposed in said main body; a sealing element of elastic material which is fixedly disposed in a mounting space, with at least a portion of the periphery of said sealing element being braced against transverse deformation, said sealing element furthermore being able to block off access of said supply inlet to said outlet opening; and an actuating member which, when said coupling head is connected to a cooperating coupling head, is displaceable against spring force for opening the passage from said supply inlet to said outlet opening for said pressure medium, on said valve body there being provided an abutment against which at least one counter abutment of said actuating member rests under force; the improvement wherein:
    said main body is provided with a guide part for said actuating member which has a threaded bore;
    said valve body being formed by a screw which is screwed into said threaded bore of said guide part;
    said valve screw having a head which includes said abutment for said actuating member, with the latter surrounding, and being spaced from, said valve screw;
    said mounting space being provided on one of said abutment and said actuating member, with the thickness of said sealing element being greater than the depth of said mounting space; and
    at least one flow-through channel being provided between said guide part and said actuating member; in the open position of said actuating member, said flow-through channel connecting said supply inlet with said outlet opening; said counter abutment of said actuating member being in the form of a circumferentially extending, radially inwardly directed flange; said main body having a base from which said guide part extends toward said counter abutment flange of said actuating member; said actuating member comprising two parts, namely a first part and a second part, which are securely interconnected; said first and second parts of said actuating element being made of synthetic material, and being welded together.

10. A coupling head according to claim 9, in which said first part includes a sleeve-like end section, with said second part being seated on, and partially overlapping, said sleevel-like end section of said first part.

11. A coupling head for pressure medium lines of pressure medium brake units in vehicles, said coupling head including: a main body having at least one supply inlet, and at least one outlet opening, for said pressure medium; a valve body fixedly disposed in said main body; a sealing element of elastic material which is fixedly disposed in a mounting space, with at least a portion of the periphery of said sealing element being braced against transverse deformation, said sealing element furthermore being able to block off access of said supply inlet to said outlet opening; and an actuating member which, when said coupling head is connected to a cooperating coupling head, is displaceable against spring force for opening the passage from said supply inlet to said outlet opening for said pressure medium, on said valve body there being provided an abutment against which at least one counter abutment of said actuating member rests under force; the improvement wherein:
  said main body is provided with a guide part for said actuating member which has a threaded bore;
  said valve body being formed by a screw which is screwed into said threaded bore of said guide part;
  said valve screw having a head which includes said abutment for said actuating member, with the latter surrounding, and being spaced from, said valve screw;
  said mounting space being provided on one of said abutment and said actuating member, with the thickness of said sealing element being greater than the depth of said mounting space; and
  at least one flow-through channel being provided between said guide part and said actuating member; in the open position of said actuating member, said flow-through channel connecting said supply inlet with said outlet opening; said counter abutment of said actuating member being in the form of a circumferentially extending, radially inwardly directed flange; said main body having a base from which said guide part extends toward said counter abutment flange of said actuating member; said actuating member comprising two parts, namely a first part and a second part, which are securely interconnected; said first part including a sleeve-like end section, with said second part being seated on, and partially overlapping, said sleeve-like end section of said first part; said first part of said actuating member having a further section, and a radially outwardly directed flange, with said further section extending from one side of said flange in a first direction, and with said sleeve-like end section extending from the other side of said flange in the opposite direction.

12. A coupling head according to claim 11, in which said second part of said actuating member has an end face which is directed toward said flange of said first part; and in which said actuating element has an annular groove for at least one seal, with said annular groove being delimited by said flange of said first part, said sleeve-like end section of said first part, and said end face of said second part.

* * * * *